UNITED STATES PATENT OFFICE.

BERNARD SHIRLEY DYER, OF LONDON, ENGLAND.

WASH FOR HOP-PLANTS, &c.

SPECIFICATION forming part of Letters Patent No. 600,414, dated March 8, 1898.

Application filed December 1, 1896. Serial No. 614,122. (No specimens.) Patented in England May 5, 1896, No. 9,566.

*To all whom it may concern:*

Be it known that I, BERNARD SHIRLEY DYER, a subject of the Queen of Great Britain and Ireland, residing at London, England, have invented a new or Improved Composition of Matter for Use as a Dressing or Wash for Hop and other Plants, (for which Letters Patent were granted in Great Britain May 5, 1896, bearing No. 9,566,) of which the following is a specification.

This invention relates to improved compositions of matter for use as a dressing or wash for the purpose of protecting hop and other plants from and of mitigating the evil effects of the attacks of insect or animal pests or parasites and of mold, mildew, or fungoid or vegetable parasites, and also for the purpose of destroying such animal or insect pests or parasites, or mold, mildew, or fungoid or vegetable parasites. For these purposes I produce a composition, as hereinafter described, containing picric acid or a picrate or picrates, or picric acid and a picrate or picrates, and adhesive substances soluble in water. Sometimes I add an alkaline compound. A suitable adhesive substance is soft soap. Suitable alkaline compound is one or more of the following, viz: an alkali or alkalies, an alkaline sulfid, or alkaline sulfids. In practicing my invention the proportions will obviously vary according to circumstances and whether it is desired to produce the composition in the first instance in the form of a more or less weak solution or in a concentrated form. The composition may be made by dissolving the materials and mixing them together, so as to form a solution of a convenient degree of concentration, which can afterward be diluted with water to a suitable extent or by mixing them in the form of a paste, which may be afterward so diluted. The wash may be distributed in the usual way. I have found the following proportions to be productive of good results: one-half to three-fourths of a pound (or thereabout) of picric acid, five pounds (or thereabout) of soft soap, three-fourths of a pound (or thereabout) of liver of sulfur, and one hundred gallons (or thereabout) of water.

In preparing the composition I mix the ingredients into a paste or dissolve them in sufficient water to make a solution or emulsion, the quantity of water at this stage being immaterial, except as a matter of convenience. The paste or concentrated solution I afterward dilute with the remainder of the water to form one hundred gallons (or thereabout) of solution for use as a wash.

Although in the foregoing example soft soap is the adhesive substance, other substances possessing similar adhesive properties soluble in water and not injurious to plants may be substituted, but I consider that soft soap is to be preferred; also, in lieu of picric acid an equivalent proportion of a picrate or picrates might be substituted, and in lieu of the liver of sulfur an equivalent proportion of other alkaline sulfid or sulfids might be employed. Furthermore, the proportions mentioned of the several ingredients may be variously modified, and some of the ingredients—for example, the liver of sulfur or alkaline sulfid—may, in some cases, be omitted. For instance, I have found that to produce a composition suitable for protecting hop and other plants from the attacks of aphis the quantity of picric acid used in proportion to that of the other ingredients may be considerably reduced and liver of sulfur may be omitted, quantities giving good results being two and one-half ounces (or thereabout) of picric acid, five pounds (or thereabout) of soft soap, and one hundred gallons (or thereabout) of water. A small quantity of soda may, if desired, be used to expedite the solution of the picric acid, or a corresponding quantity of picrate of soda may used in place of picric acid.

What I claim is—

1. A composition of matter for use as dressing or wash for hop and other plants, comprising picric acid or picrate, adhesive substance soluble in water and an alkaline compound such as liver of sulfur in substantially the proportions specified.

2. The herein-described composition of matter for use as dressing or wash for hop and other plants consisting of picric acid, soft soap, liver of sulfur and water in substantially the proportions mentioned.

In testimony whereof I have signed my name to this specification in the presence of two subscribing witnesses.

BERNARD SHIRLEY DYER.

Witnesses:
EDMUND S. SNEWIN,
WM. O. BROWN.